Figure 4:
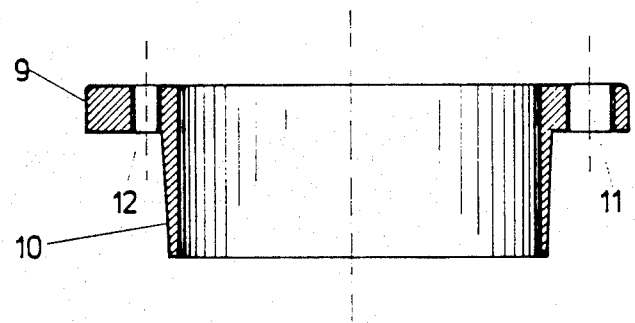

United States Patent [19]

Vinther, Soren

[11] Patent Number: 4,867,642
[45] Date of Patent: Sep. 19, 1989

[54] WIND MILL WING WITH AIR BRAKE

[75] Inventor: Vinther, Søren, Herning, Denmark

[73] Assignee: Danregn Vindkraft A/S, Brande, Denmark

[21] Appl. No.: 213,713

[22] Filed: Jun. 30, 1988

[51] Int. Cl.$^4$ .............................................. F03D 7/04
[52] U.S. Cl. .................................... 416/23; 416/32; 416/89; 416/169 R
[58] Field of Search ................ 416/23, 32 A, 89 A, 416/89 R, DIG. 7, 169 B, 19, 24, 207, 50 A, 51 A, 52 A, 209

[56] References Cited

U.S. PATENT DOCUMENTS

| 932,521 | 8/1909 | Wallace | 416/23 X |
|---|---|---|---|
| 1,947,073 | 2/1934 | Wilson | 416/207 |
| 1,995,460 | 3/1935 | Decker | 416/207 X |
| 2,058,500 | 10/1936 | Plucker | 416/23 X |
| 2,074,149 | 3/1937 | Jacobs | 416/23 X |
| 4,187,056 | 2/1980 | Schwinn et al. | 416/207 |
| 4,257,736 | 3/1981 | Jacobs | 416/89 A X |
| 4,575,309 | 3/1986 | Brown | 416/32 A X |
| 4,715,782 | 12/1987 | Shimmel | 416/23 X |

FOREIGN PATENT DOCUMENTS

| 74199 | 5/1952 | Denmark | 416/DIG. 7 |
|---|---|---|---|
| 477371 | 6/1929 | Fed. Rep. of Germany | 416/89 |
| 504949 | 7/1920 | France | 416/19 |
| 704045 | 5/1931 | France | 416/23 |

Primary Examiner—Everette A. Powell, Jr.
Attorney, Agent, or Firm—Darby & Darby

[57] ABSTRACT

By mounting an axle (18,19) in a wind mill wing (1) having a wing tip (22) capable of swinging out by means of a mounting (2,7,8) which may be bolted to the wing and which can furthermore squeeze about the axle (18), it is possible to mount this mounting on new wings as well as old wings in case the mountings thereof have become loose.

7 Claims, 5 Drawing Sheets

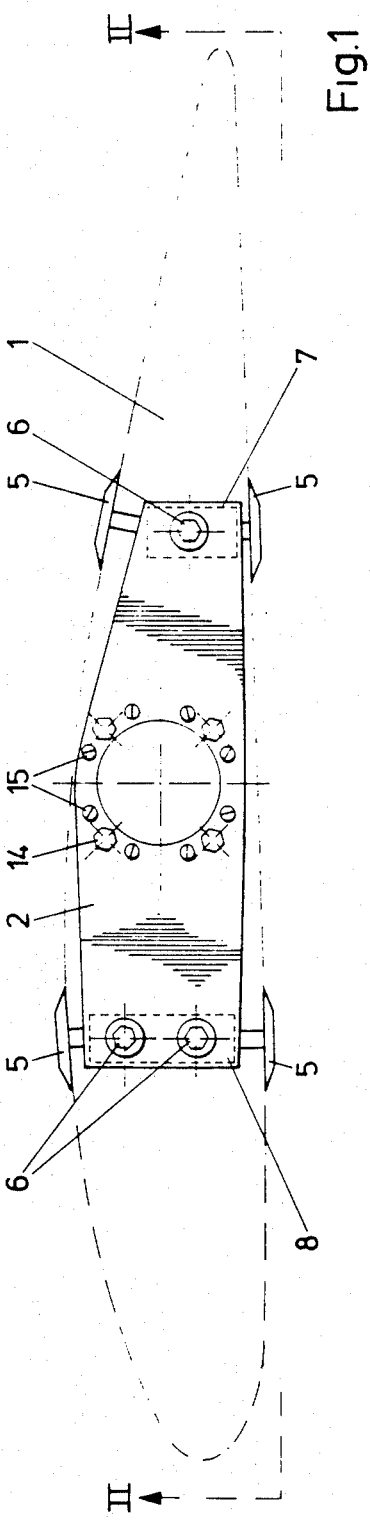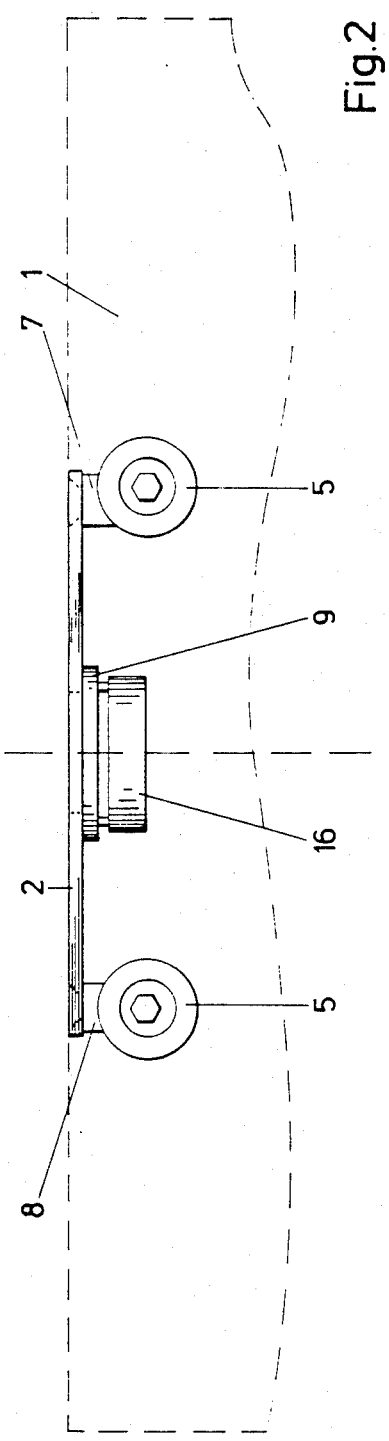

WIND MILL WING WITH AIR BRAKE

The invention relates to a wind mill wing with air brake in the form of a wing tip which is automatically turned out when the speed of rotation of the wing exceeds a certain level said wing tip being arranged on an axle anchored in the wing.

Wings with a variable pitch may be braked by turning the wing so that it is feathered and thereby operates as an air brake.

By wings with a fixed pitch, however, this braking action may only be effected by means of an air brake mounted by the wing tip and which may be turned and thus operate as a brake when rotating.

An end air brake with a pivotable wing tip is designed in such a manner that the wing tip may pivot about a fixed axle anchored in the wing. The wing and the wing tip are usually made of glass fiber so that the axle can be embedded or cast in the wing in such a manner that it protrudes from the wing end. To ensure that the axle is securely anchored in the wing, the lower part of the axle being deep-seated in the wing is provided with a number of anchor plates preventing the axle from being jerked out of the wing when same rotates.

To secure the axle against sideways stresses there is provided at the top thereof i.e. close to the end of the wing a transverse anchor plate welded thereto which is likewise embedded or cast in the glass fibre and thereby functions as the upper attachment of the axle in the wing.

When using wings with such a cast-in axle, it has turned out, however, that the attachment is not secure in that the attachment may come loose thereby making the position of the axle unstable. During operation, air currents around the wing tip will cause vibrations in the wing tip. These vibrations cause wear between the axle and the anchor plate, thereby gradually increasing the clearance between these two parts during operation, although no rotation of the axle relative to the wing and anchor plate occurs. This may result in an inaccurate wing tip position relative to the remaining wing and adverse air currents and air noise may thereby arise disadvantageously. This is inconvenient since it reduces the effect and makes noise.

There is moreover a risk that the wing will become unbalanced which may entail an extra load on hubs and bearings and in its turn result in increased wear on these vital mill components.

It is the object of the invention to improve the attachment of the axle in the wing and thus remedy the drawbacks which may appear by the previously known attachments and this is achieved when at its outer end the wing is provided with an adjustable split bushing around the axle, said bushing being secured to a mounting which is bolted to the wing by means of a number of bolts screwed in from outside in threaded holes in the mounting.

This attachment of the axle in the outer end of the wing provides a hitherto unknown good attachment to the axle as well as the wing. There are no weldings of the parts whatsoever but solely a mechanical clamping by means of a split bushing around the axle and a bolting of the mounting to the edge section of the wing, respectively. This makes it possible to adjust the position of the shaft relative to the wing since it is possible to finely adjust the clamping by means of generally known means such as clearances, washers etc.

Moreover, it is possible to use this mounting in existing wings by removing the old bushing with anchor plate welded thereto and providing the wing with this mounting.

By providing the mounting, as disclosed in claims 2 and 3, with a split bushing and a co-operating retaining ring which may be tightened by means of bolts from the upper side of the mounting, it is possible to tighten up the bushing according to requirement when checking the wing. This substantially reduces maintenance work since it may be done without taking down the wing.

Finally, it is advantageous, as disclosed in claim 4, to secure the mounting in the wing by means of bolts which may from outside by screwed into threaded holes in the mounting. This will facilitate replacement of the mounting and tightening up of same.

Figure 3:
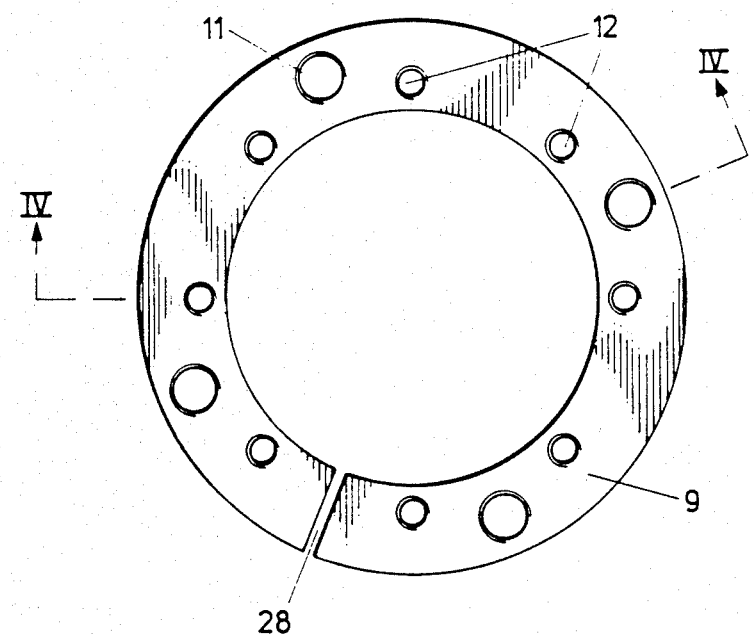
Figure 6:
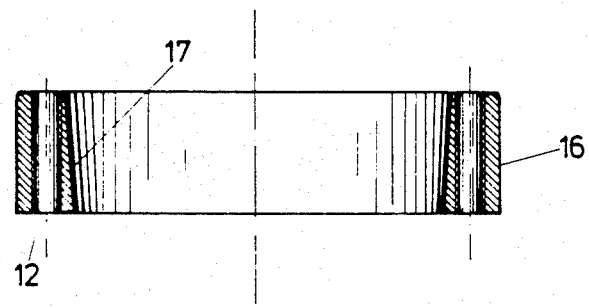
Figure 5:
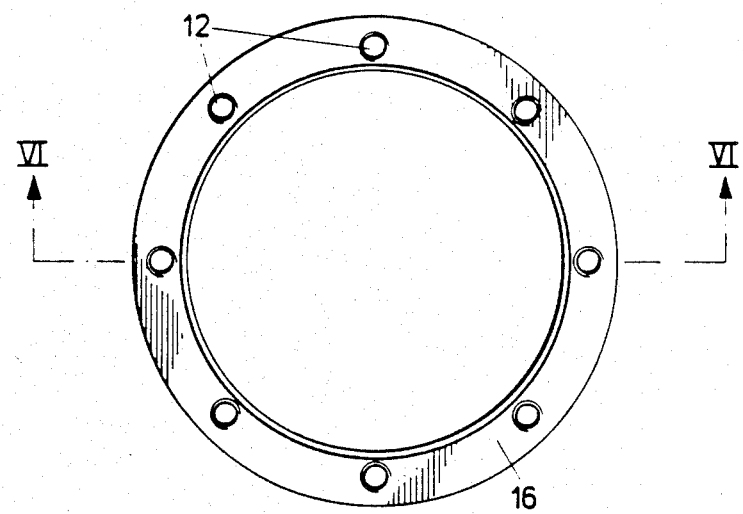
Figure 7:
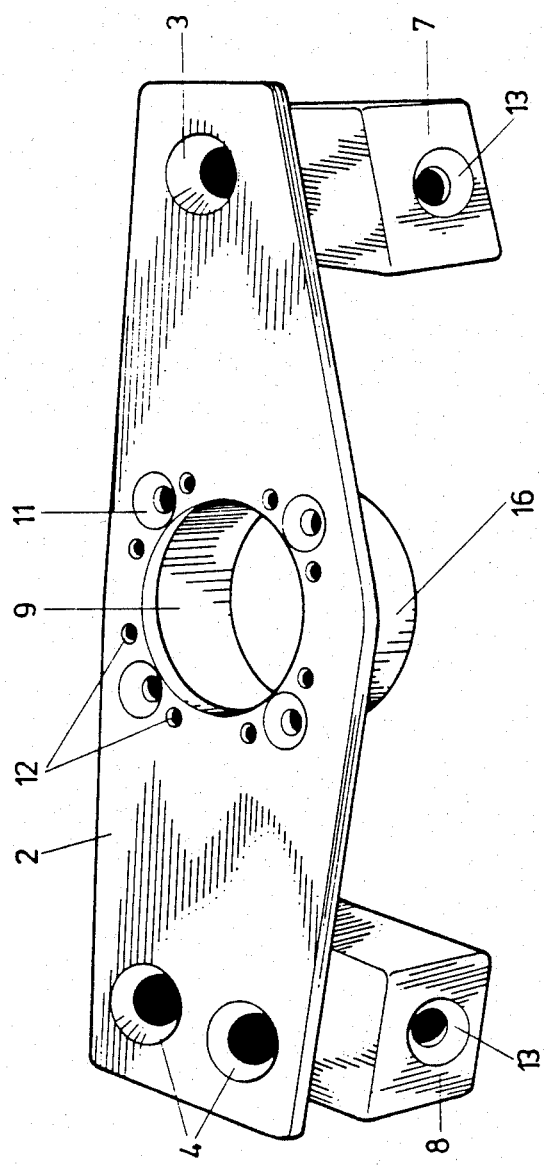
Figure 8:
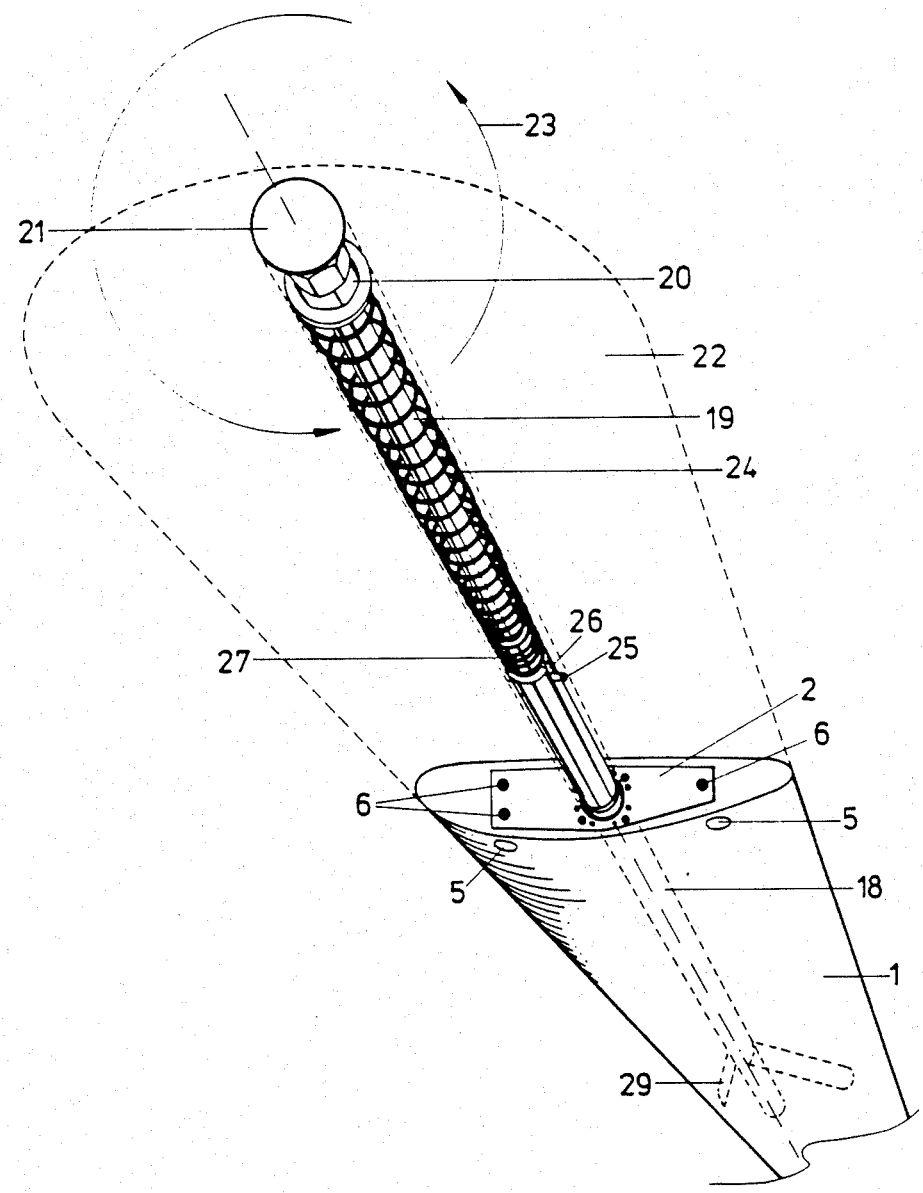

The invention will be further described in the following with reference to the drawing wherein FIG. 1 is a top view of the mounting fitted in a wing, FIG. 2 is a side view of the mounting seen in the direction II—II in FIG. 1, FIG. 3 is a top view of the split bushing, FIG. 4 is a sectional view of the split bushing along the line IV—IV in FIG. 3, FIG. 5 is a top view of the retaining ring, FIG. 6 is a sectional view of the retaining ring along the lne VI—VI in FIG. 5, FIG. 7 is a perspective view of the mounting, and FIG. 8 is the outer end of a wing with wing tip viewed in perspective.

In FIG. 8 the outer end of a wind mill wing 1 is shown in solid lines whereas the wing tip 22 is indicated in broken lines.

The air brake comprises the wing tip 22 in that a centrifugal clutch will release the tip when same exceeds a pre-determined speed of rotation in such a manner that the tip is turned out in the direction indicated by the arrow 23 and positioned transversely to the wing 1 whereby it will function as an air brake.

The wing tip encloses an axially outer part 19 of an axle 18 which at its lower end is anchored in the wing.

For releasing the turn of the tip there is mounted a compressed coil spring 24 about the axle 18, compressed meaning that it is twisted around its longitudinal axis. The spring is furthermore compressed in its longitudinal direction and is secured at its outermost by the nuts 20 to the tip under the cover 21 which cover is screwed into the end of the through-channel wherein the axle 19 and the spring 24 are mounted.

The lower end of the spring 24 is secured to the axle 18 so that due to its compression, it will turn the wing tip 22 on the release of the air brake.

The release takes place by means of a slidable bushing 27 arranged on the outer part 19 said bushing being provided with a pair of outwardly extending pins 25 sliding in grooves 26 extending in the longitudinal direction of the axle 18 from the terminal edge of the thickening of the axle and a distance inwards. By exceeding a given centrifugal force the bushing 27 will be slid outwards against the force of the spring 24 and at some time the pins 25 are out of the grooves 26 whereby the spiral coil 24 will at once turn the tip to take a position where it will function as an air brake.

The axle 18 is anchored in the wing 1 by means of a mounting at the top, i.e. on the end of the wing 1 facing the wing tip 22, and a cast-in anchor 29 at the bottom.

As shown in FIGS. 1, 2 and 7, the mounting comprises a plate 2 which at the ends thereof is provided with a mounting unit 7,8. Each of these units is secured by means of bolts 6 through sunk holes 3,4 in the plate 2 and in threaded holes in the units 7,8.

The mounting units are furthermore provided with threaded holes 13 at the ends thereof and bolts 5 which may be screwed in from outside on the wing 1 as shown in FIGS. 1, 2 and 8.

Moreover, at the centre of the plate 2 there is secured a split bushing 9 by means of bolts 14 through sunk holes 11. The bushing 9 is shown on FIGS. 3 and 4 and comprises a flange with holes 11, 12 and a cylindrical part showing an external conical 10 section.

Furthermore, the bushing is slit in the side 28 permitting the diameter thereof to be varied.

Around the conical part 10 of the bushing 9 there is moreover mounted a retaining ring 16 shown on FIGS. 5 and 6. The ring is provided with holes 12 and with an internal cone 17 which may co-operate with the external cone 10 of the bushing 9 by means of screws 15 passing partly through the plate, see FIG. 7, and partly through holes in the bushing and the ring and which by tightening thereof reduces the diameter of the bushing.

The securing of the mounting will now be described. Having removed any previously fitted mounting the wing is trimmed and recesses are made for the mounting.

Then the mounting units 7,8 are secured by means of bolts 5 through holes in the wing side. The mounting is subsequently slid down the axle 19 into the recess in the wing and is secured by means of bolts 6 through holes 3,4 in the plate 2 the bushing 9 having been tightened for clamping about the axle 18 by means of bolts 15.

The axle 18,19 will then be firmly secured in the wing 1 and the axle may be tightened up according to requirements. Since this tightening up and adjustment may be made from outside, it is possible to effect some without dismounting and taking down the wing.

I claim:

1. Wind mill wing with an air brake in the form of a wing tip which is automatically turned out when the speed of rotation of the wing exceeds a certain level, said wing tip being arranged on an axle anchored in the wing, characterized by an adjustable split bushing (9) disposed at an outer end of the wing (1) around the axle (18), a mounting (2, 7, 8) bolted to the wing by means of a number of bolts (5) screwed in from outside in threaded holes (13) in the mounting (7, 8), the bushing being secured to the mounting.

2. Wind mill wing according to claim 1, characterized by a flange provided at one end of the split bushing (9), the flange having a number of threaded holes (11) which flange partly engages the underside of a mounting plate (2) and partly has cooperating holes (11) for clamp bolts (14) and where the split bushing (9) has a slit (28) in the side wall thereof, the flange having an external taper towards its end for forming a cone (10), a retaining ring (16), with a corresponding cone (17), provided for cooperating with said cone (10), the retaining ring (16) being tightenable on the split bushing (9) for squeezing the axle (18) and reducing the internal diameter of the bushing.

3. Wind mill wing according to claim 1 characterized in that the mounting plate (2), the split bushing (9) and retaining ring (16) are provided with through-holes (12), said holes being arranged end to end, bolts (15) extending from an upper side of the mounting plate (2) through the through-holes (12) so that the retaining ring (16) may be tightened by means of the bolts (15).

4. Wind mill wing according to claim 1 characterized by two mounting units (7, 8) secured to the underside of the mounting by the ends of the plate (2), the mounting units provided with threaded holes (13) at the sides thereof, the bolts (5) extending through the side walls of the wing (1) for engaging the threaded holes (13).

5. Wind mill wing according to claim 2 characterized in that the mounting plate (2), the split bushing (9) and retaining ring (16) are provided with through-holes (12), said holes being arranged end to end, bolts (15) extending from an upper side of the mounting plate (2) through the through-holes (12) so that the retaining ring (16) may be tightened by means of the bolts (15).

6. Wind mill wing according to claim 2 characterized by two mounting units (7, 8) secured to the underside of the mounting by the ends of the plate (2), the mounting units provided with threaded holes (13) at the sides thereof, the bolts (5) extending through the side walls of the wing (1) for engaging the threaded holes (13).

7. Wind mill wing according to claim 3 characterized by two mounting units (7, 8) secured to the underside of the mounting by the ends of the plate (2), the mounting units provided with threaded holes (13) at the sides thereof, the bolts (5) extending through the side walls of the wing (1) for engaging the threaded holes (13).

* * * * *